(12) United States Patent
Gross et al.

(10) Patent No.: US 7,370,446 B2
(45) Date of Patent: May 13, 2008

(54) ADAPTER FOR ATTACHMENT TO AN IRONING BOARD

(75) Inventors: Christian Gross, Netphen (DE);
Norbert Pakusa, Schweighausen (DE);
Daniel Vogt, Seelbach (DE)

(73) Assignee: Leifheit AG, Nassau/Lahn (DE)

( * ) Notice: Subject to any disclaimer, the term of this patent is extended or adjusted under 35 U.S.C. 154(b) by 354 days.

(21) Appl. No.: 11/271,646

(22) Filed: Nov. 10, 2005

(65) Prior Publication Data

US 2006/0107559 A1 May 25, 2006

(30) Foreign Application Priority Data

Nov. 12, 2004 (DE) ................. 20 2004 017 546 U

(51) Int. Cl.
*D06F 81/00* (2006.01)
*D06F 79/00* (2006.01)
(52) U.S. Cl. .......................................... 38/107
(58) Field of Classification Search ............ 38/103, 38/104, 106, 107, 141; 219/246, 247, 256, 219/259; 439/535, 574; 248/117.4, 51, 248/117.1, 117.2; 363/146; 361/600
See application file for complete search history.

(56) References Cited

U.S. PATENT DOCUMENTS

| | | | | |
|---|---|---|---|---|
| 2,271,463 A * | 1/1942 | Reeves | ........................ | 439/535 |
| 2,321,261 A * | 6/1943 | Steele | ............... | 38/75 |
| 2,487,292 A * | 11/1949 | Aske | ............... | 38/107 |
| 2,585,758 A * | 2/1952 | Fjermestad | ................... | 38/142 |
| 2,609,626 A * | 9/1952 | Lewis | ................... | 38/107 |
| 2,636,295 A * | 4/1953 | Millman | ................... | 38/142 |
| 2,680,789 A * | 6/1954 | Robinson | .................. | 191/12 S |
| 3,049,688 A * | 8/1962 | Sinopoli | ....................... | 439/41 |
| 3,202,389 A * | 8/1965 | Zoffer | ................... | 248/117.4 |
| 4,543,624 A * | 9/1985 | Rumble | ...................... | 363/146 |
| 4,948,945 A * | 8/1990 | Wu | ............... | 219/247 |
| 5,142,802 A * | 9/1992 | Krause | ................... | 38/107 |
| 5,702,075 A * | 12/1997 | Lehrman | ...................... | 248/51 |
| 5,926,984 A * | 7/1999 | Zuber | ............ | 38/107 |
| 6,243,257 B1 * | 6/2001 | Ester | ........................ | 361/625 |
| 7,083,421 B1 * | 8/2006 | Mori | ........................ | 439/574 |

* cited by examiner

*Primary Examiner*—Ismael Izaguirre
(74) *Attorney, Agent, or Firm*—Darby & Darby

(57) ABSTRACT

An adapter for attachment to an ironing board includes a housing that can be affixed to a rest plate for an iron. A means is provided on the housing for affixing a socket for the electrical plug of an iron.

11 Claims, 3 Drawing Sheets

ADAPTER FOR ATTACHMENT TO AN IRONING BOARD

Priority is claimed to German patent application DE 20 2004 017 546, the entire subject matter of which is hereby incorporated by reference herein.

The present invention relates generally to ironing boards, and specifically to an adapter for attachment to an ironing board, the adapter having a housing that can be affixed to a rest plate for an iron and flexibly provided with electrical connectors.

BACKGROUND

There are ironing boards with a rest plate shaped onto the side, said rest plate having an outlet with a cable. The cable can be plugged into an outlet of a power supply network so that the socket affixed to the rest plate serves for connection with the plug of an iron. The drawback of such permanently integrated sockets is that they are permanently connected to the rest plate for the iron so that the buyer always has to purchase the ironing board together with the electric power supply. Furthermore, different countries use different plugs so that a given ironing board can only be used there if a plug that matches the socket is provided on the iron.

SUMMARY OF THE INVENTION

Therefore, it is an object of the present invention to provide an adapter for attachment to an ironing board as well as a corresponding ironing board that can be flexibly provided with electrical connectors onto which sockets for various plug types can be mounted.

The present invention provides an adapter for attachment to an ironing board, having a housing that can be affixed to a rest plate for an iron, whereby a means is provided on the housing for affixing a socket for the electrical plug of the iron. By means of this adapter, the buyer of the ironing board can either choose not to mount an electrical connector onto the rest plate or else to affix a socket onto the adapter so that the plug of the iron can easily be affixed to the rest plate of the ironing board. Here, the socket for the plug can be configured in such a way as to meet the requirements of the country in question.

Preferably, the housing has a box-shaped receptacle for the socket, whereby the receptacle has an insertion opening and a lateral opening for inserting the plug into the socket. In this manner, the socket can be essentially enclosed by the box-shaped receptacle of the housing and only the insertion opening and a lateral opening for the connection openings are present. In order for the socket to be affixed so as to be as form-fitting as possible, a web-like projection is provided on the receptacle, said projection being shaped on for purposes of connection to the socket. Guide means and clamping means can be provided on the projection in order to affix the socket.

In order to affix the adapter onto the rest plate, screw channels are provided on the housing for purposes of connection to the adapter. As a result, the adapter can be mounted in a simple manner.

In order to expand the functionality of the adapter, an elastic cable guide for the iron is provided on the housing. Such a cable guide can be formed by a metal wire that projects upwards from the housing and that then facilitates the use of the iron.

According to the invention, an ironing board with a rest plate for an iron is also provided, whereby an adapter having a housing is affixed to the rest plate, said adapter having a means for affixing a socket for the electrical plug of an iron. The rest plate can be shaped like a frame and can have a recess into which the adapter is inserted.

BRIEF DESCRIPTION OF THE DRAWINGS

The invention will be explained in greater detail below based on an embodiment, with reference to the accompanying drawings. The following are shown.

DETAILED DESCRIPTION

Figure 1:
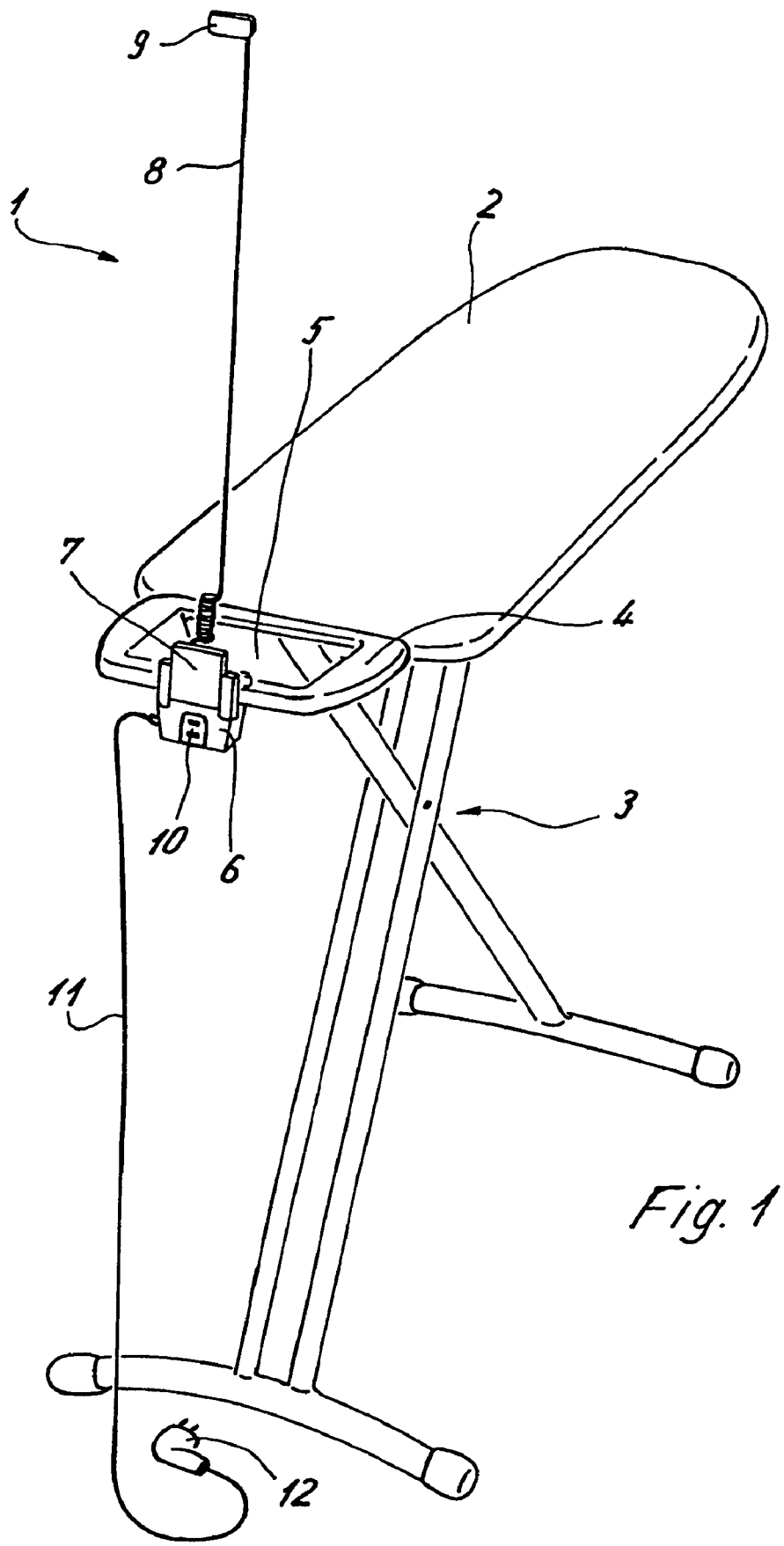
FIG. 1 shows a perspective view of an embodiment of an ironing board with an adapter.
Figure 2:
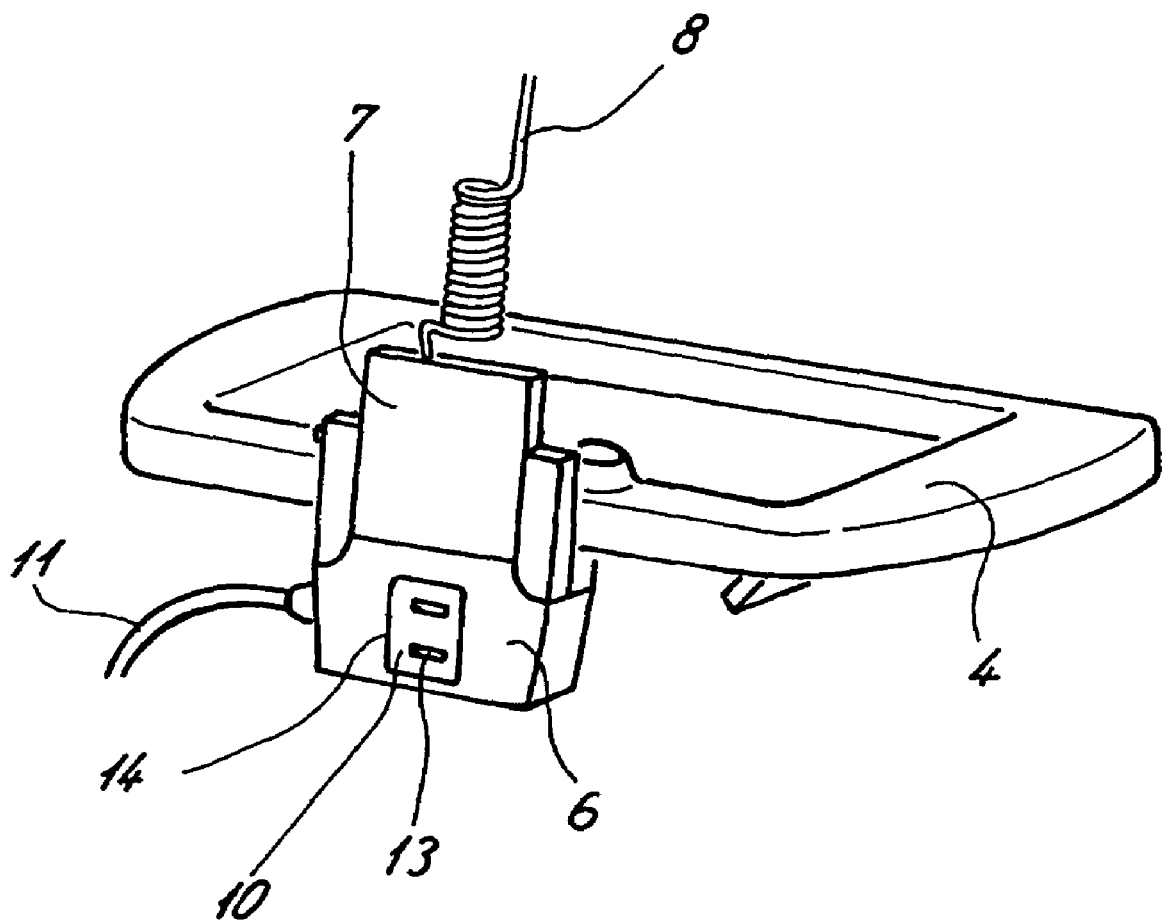
FIG. 2 shows a perspective view of the adapter on the ironing board of FIG. 1.

An ironing board 1 comprises a board 2 that is secured on a stand having pivoting legs 3 that can be placed on the floor. At an edge of one end of the board 2, a frame-like rest plate 4 is provided in which an iron can be placed. For this purpose, a centered opening 5 is provided that is configured so as to be smaller than an iron so that the iron can only be partially inserted into the opening 5 and otherwise lies on the frame-like rest plate 4.

An adapter with a housing 6 made of plastic is mounted on the rest plate 4 and this adapter has a holder 7 that is inserted into the upper area. A cable guide 8 is affixed onto the holder 7, said cable guide being made of a metal wire that is bent in the lower section to form a spring and that projects upwards. A clip 9 is affixed at one upper end section so that a cable of an iron can be held on the cable guide 8 in order to facilitate the ironing procedure.

A socket 10 is affixed to the housing 6 of the adapter, said socket being connected to a plug 12 via a cable 11. The plug 12 can be connected to an electric power line.

The socket 10 is configured in such a way that two slits 13 are located at an opening 14 of the housing 6 so that the plug of the iron can be inserted into the slits 13 for purposes of being supplied with electric power.

Figure 3:
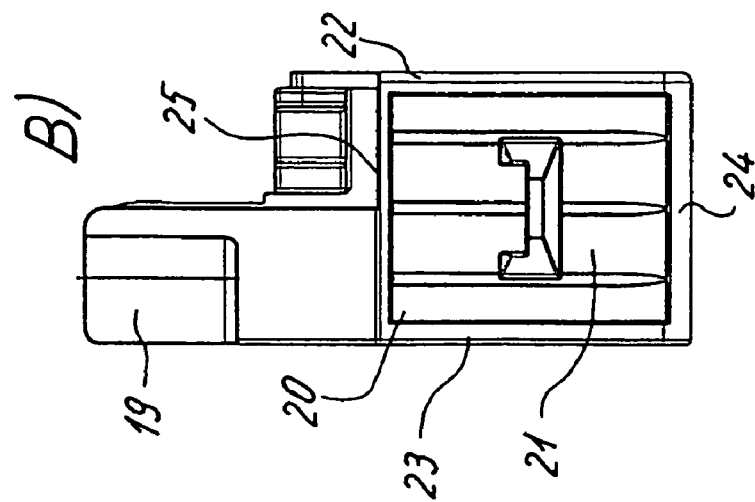
FIG. 3A shows a side elevational view of the housing of the adapter of FIG. 1.
FIG. 3B shows a front elevational view of the housing of the adapter of FIG. 1.
FIG. 3C shows a top plan view of the housing of the adapter of FIG. 1.
FIG. 3D shows a cross-sectional view, through line 17 of FIG. 3A, of the housing of the adapter of FIG. 1.
Figure 3:
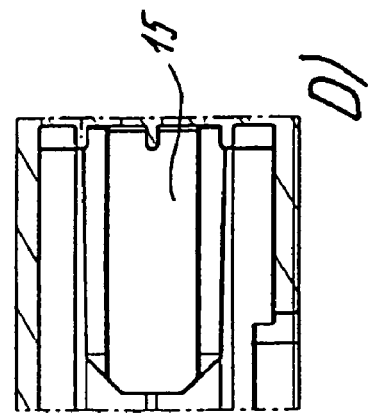
Figure 3:
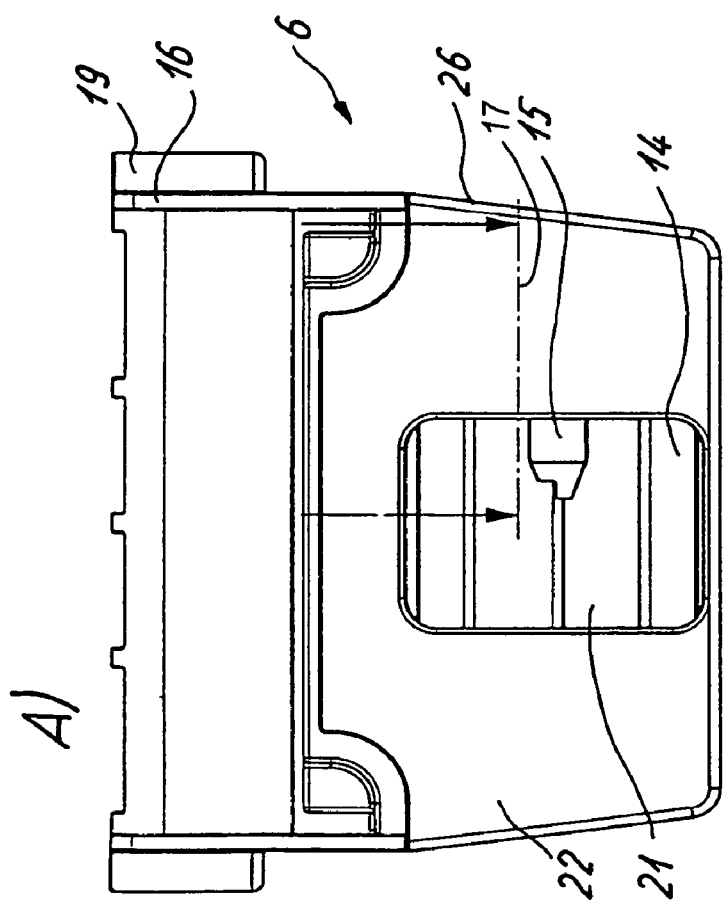
Figure 3:
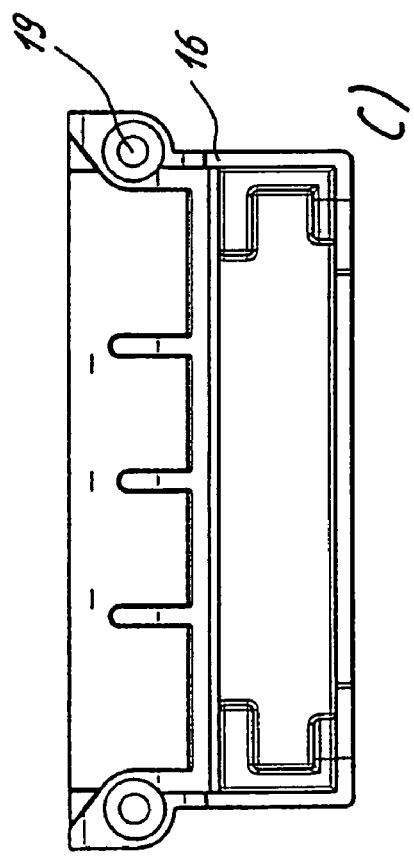

The housing 6 is shown in detail in FIGS. 3A through 3D. The housing 6 comprises a box-shaped receptacle 21 that is enclosed by side walls 22 and 23 as well as by a bottom 24 and a cover 25. An opening 14 has been made in the side wall 22 and, on one front face, the receptacle 21 has an open configuration so that the socket 10 can be inserted into the receptacle 21. In order to affix the socket 10, a web-like projection 15 is shaped onto an opposite face wall 26, whereby the cross section of the projection 15 is U-shaped and has clamping or latching means that interact with the socket 10 so that the latter is essentially held on the housing 6 positively and non-positively.

The housing also has two side parts 16 on which projecting screw channels 19 are formed. Screws can be inserted into the screw channels 19 in order to affix the housing 6 to the rest plate 4.

The housing 6 is affixed to the rest plate 4 and the user can subsequently slide a socket 10 into the box-shaped receptacle 21 until it engages with the web-like projection 15 and the two slits 13 are positioned in the area of the opening 14 so that the plug of an iron can be inserted into the slits 13. The precise shape of the socket 10 and the electrical connection specifications, however, can be country-non-specific since the adapter merely provides the mechanical connection for the plug of the iron with the socket 10.

What is claimed is:

1. An ironing board comprising:
   an iron rest plate; and
   an adapter comprising a housing attachable to the iron rest plate of the ironing board, the housing including a socket attachment device configured to removably and slidably receive a socket for an electrical plug of the iron so as to connect the socket to a power supply.

2. The ironing board as recited in claim 1 wherein the socket attachment device includes a box-shaped receptacle configured to receive the socket, the receptacle including an insertion opening and a lateral opening configured to enable an inserting of the plug into the socket.

3. The ironing board as recited in claim 2 wherein the receptacle includes a web-like projection configured for connecting to the socket.

4. The ironing board as recited in claim 1 wherein the housing includes at least one screw channel configured to connect the adapter to the rest plate.

5. The ironing board as recited in claim 1 further comprising an elastic cable guide for the iron, the elastic cable guide being disposed on the housing.

6. The ironing board as recited in claim 5 wherein the cable guide includes a metal wire projecting upward from the housing.

7. The ironing board as recited in claim 1 wherein the adapter includes a plastic material.

8. An ironing board comprising:
   a rest plate for an iron; and
   an adapter attached to the rest plate, the adapter including a housing, the housing including a socket attachment device configured to removably receive a socket for an electrical plug of the iron so as to connect the socket to a power supply and a latch configured to hold the socket in the housing.

9. The ironing board as recited in claim 8 wherein the rest plate includes a frame with a recess, the adapter being inserted into the recess.

10. An adapter for attachment to an ironing board, the adapter comprising:
    a housing;
    a receptacle disposed in the housing and configured to slidably receive a socket for an electrical plug of the iron so as to connect the socket to a power supply;
    a latch disposed in the receptacle and configured to hold the socket in the housing; and
    an elastic cable guide disposed on the housing and including a metal wire projecting upward from the housing.

11. The adapter as recited in claim 10, wherein the housing is configured to attach to a rest plate of the ironing board.

* * * * *